United States Patent [19]
Rybicki et al.

[11] 3,764,230
[45] Oct. 9, 1973

[54] ARTICULATED HELICOPTER ROTOR UTILIZING PLURAL ELASTOMERIC BEARINGS FOR ARTICULATED SUPPORT OF THE BLADE FROM THE ROTOR HUB

[75] Inventors: Robert C. Rybicki; William F. Paul, both of Trumbull, Conn.

[73] Assignee: United Aircraft Corporation, East Hartford, Conn.

[22] Filed: July 5, 1972

[21] Appl. No.: 268,962

[52] U.S. Cl. .................................. 416/134, 416/141
[51] Int. Cl. ............................................ B64c 27/38
[58] Field of Search ............................ 416/134, 141

[56] References Cited
UNITED STATES PATENTS

| | | | |
|---|---|---|---|
| 3,111,172 | 11/1963 | Gorndt et al. ...................... | 416/141 |
| 3,282,350 | 11/1966 | Kisovec ............................... | 416/143 |
| 3,292,712 | 12/1966 | Schmidt .............................. | 416/134 |
| 3,501,250 | 3/1970 | Mosinskis ........................... | 416/134 |
| 3,556,673 | 1/1971 | Killian ................................ | 416/134 |
| 3,700,352 | 10/1972 | Gorndt ............................... | 416/141 |

*Primary Examiner*—Everette A. Powell, Jr.
*Attorney*—Vernon F. Hauschild

[57] ABSTRACT

An articulated helicopter rotor in which the blade is supported for articulated motion from the rotor by elastomeric bearings and including an elastomeric shear bearing adapted to take rotor in-plane and rotor out-of-plane shear loads.

31 Claims, 3 Drawing Figures

PATENTED OCT 9 1973 3,764,230

ARTICULATED HELICOPTER ROTOR UTILIZING PLURAL ELASTOMERIC BEARINGS FOR ARTICULATED SUPPORT OF THE BLADE FROM THE ROTOR HUB

CROSS-REFERENCES TO RELATED APPLICATIONS

Some of the subject matter shown and claimed in this application is disclosed and claimed in a copending application entitled "Elastomeric Bearing for a Helicopter Rotor" Ser. No. 268,963 filed on even date, a copending application entitled "Articulated Helicopter Rotor" Ser. No. 268,964 filed on even date, and a copending application entitled "Compound Bearing for Connecting a Helicopter Blade to a Helicopter Rotor" Ser. No. 268,965 filed on even date.

BACKGROUND OF THE INVENTION

1. Field of the Invention

This invention relates to articulated helicopter rotors and more particularly to articulated support of helicopter blades from helicopter rotor hub by elastomeric support bearings and including an elastomeric shear bearing to carry shear loads between the rotor and the blade.

2. Description of the Prior Art

In the helicopter rotor art, it has been common practice to utilize bearings other than elastomeric bearings to support the helicopter blade for articulated motion from the rotor hub and the problem of providing separate bearings to carry rotor shear loads was not encountered until the advent of the introduction of elastomeric bearings to so support the blades. While conventional plain bearings could be used to perform this function, such plain bearings are not considered to have the reliability of an elastomeric bearing and would accordingly constitute a weak link in the reliability chain of rotor construction which otherwise used elastomeric bearings.

SUMMARY OF THE INVENTION

A primary object of the present invention is to support a helicopter blade from a helicopter rotor hub by the use of elastomeric bearings only, including an elastomeric bearing of which carries rotor in-plane and out-of-plane shear loads.

In accordance with the present invention, the elastomeric bearings are sized and fabricated to produce a minimal space envelope for the bearing assembly, and so that there is minimal relative rotation between the shear bearing and the blade end-shaft during the rotor pitch change operation.

In accordance with the present invention, the elastomeric shear bearing is aided by a structural member in carrying blade centrifugal loads.

In this invention, the laminates of the shear bearing are oriented in a circumferential direction about the blade feathering axis and segmented so that diametrically opposed segments of laminates carry rotor in-plane shear loads and so that other diametrically opposed shear bearing laminates carry rotor out-of-plane shear loads in compression.

An additional advantage of the circumferentially segmented elastomeric shear bearing is that the laminates thereof can be easily precompressed so as to prevent tensile stresses and strain on the backside of the elastomer laminates under a reversing load. The small circumferential segments of laminates permits equal radial distribution of this precompression loading, which would not be possible if continuous laminates or large circumferentially segmented laminates were used.

In accordance with a further feature of this invention, the circumferential segmentation of the laminates can be selectively chosen so that the laminates are capable of carrying the required shear load in their plane of operation.

An object of the present invention is to provide a bearing between the blade and hub of an articulated helicopter rotor which permits three degrees of freedom of blade motion over substantial motion ranges, and which occupies a minimal space envelope and which can withstand rotor shear loads.

In accordance with the present invention, the helicopter blade is capable of flapping motion of about 30°, lead-lag motion of about 20°, and pitch change motion of about 60°.

In accordance with the present invention, the bearing assembly between the helicopter blade and rotor consists of three elastomeric bearings positioned in a series/parallel arrangement so that in at least one of the three degrees of motion freedom, the three elastomeric bearings share the required degree of motion and includes an elastomeric shear bearing.

In accordance with a further aspect of the present invention, one of the elastomeric bearings is a spherical bearing whose center is coincident with the blade flapping and lead-lag axes and which accommodates the blade flapping and lead-lag motion, and the second bearing is a stacked or disc elastomeric bearing positioned in series with respect to the spherical elastomeric bearing and which coacts therewith in carrying the blade centrifugal loading to the hub and which further coacts therewith in sharing the blade pitch change motion and an elastomeric shear bearing which carries rotor shear loads and cooperates with the other two elastomeric bearings in carrying blade centrifugal loads and to sharing pitch change motion.

Other objects and advantages of the present invention may be seen by referring to the following description and claims, read in conjunction with the accompanying drawings.

DESCRIPTION OF THE PREFERRED EMBODIMENT

Figure 1:
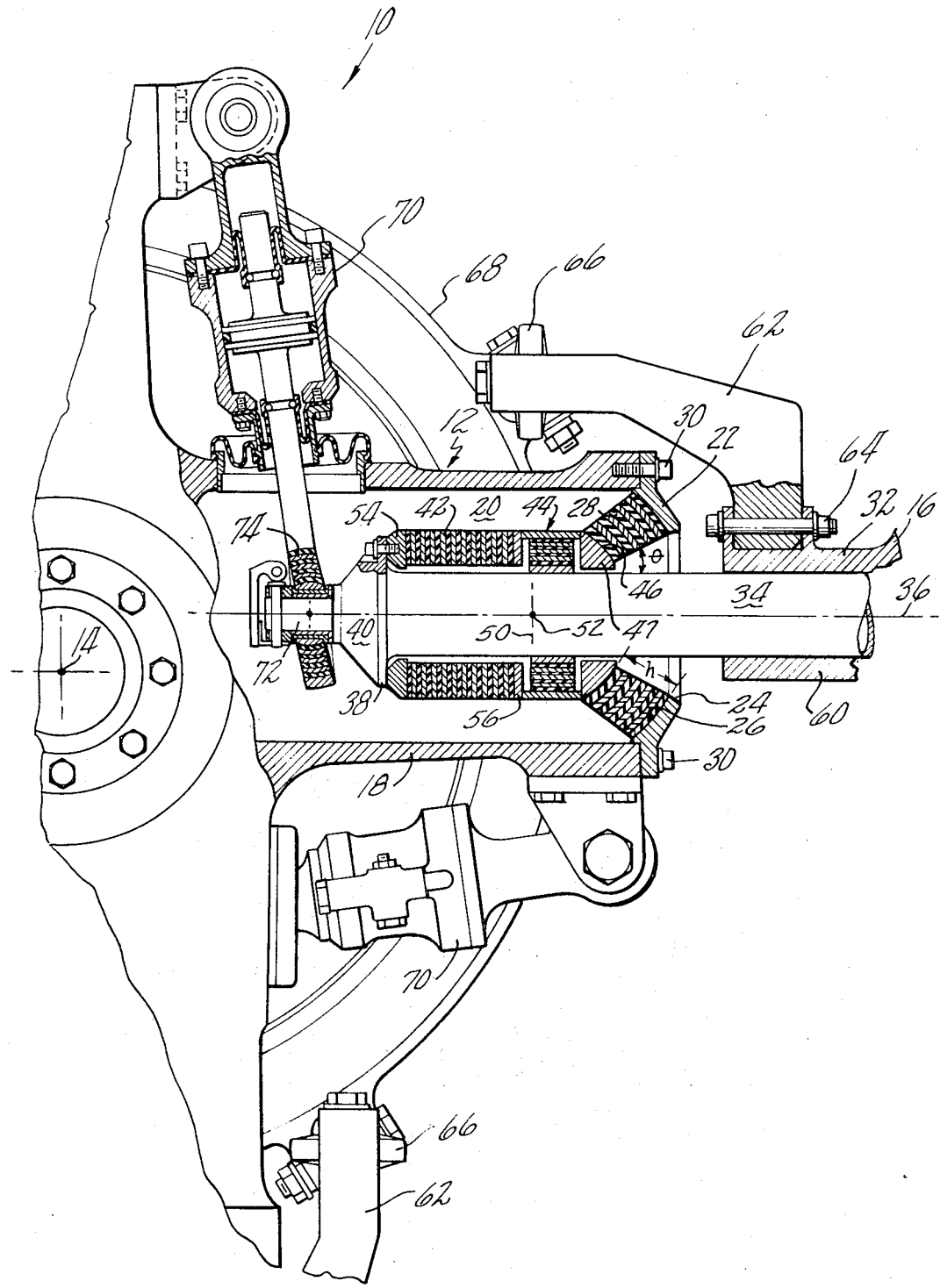
FIG. 1 is a top view, partially broken away, of an articulated helicopter rotor showing a helicopter blade supported from a helicopter hub using our bearing construction.

Referring to FIG. 1 of the drawings, we see a portion of helicopter articulated rotor head 10 which comprises hub member 12 mounted for rotation in conventional fashion about axis of rotation 14. A plurality of helicopter blades 16 are supported substantially radially from hub 12 for rotation therewith about axis 14 so as to generate lift for the helicopter in conventional fashion. It should be borne in mind that while a single blade is shown in the drawing, there are actually a number of such blades, possibly four. Hub 12 includes a chamber defining housing 18 for each blade which defines blade attachment chamber 20 therewithin. Housing 18 is preferably substantially cylindrical and extends substantially radially with respect to axis of rotation 14. Housing 18 may include as an integral part thereof mouth-shaped member 22 which defines a substantially circular opening 24 from chamber 20 and which also defines the spherical surface 26 of the outer race of the laminated spherical, annular elastomeric bearing 28. Preferably, as shown in FIG. 1, the outer race member 22 is separate from and connected to housing 18 by conventional connecting means 30.

Blade 16 is connected to hub 12 by blade connecting means 32, which comprises shaft member 34 which is preferably positioned concentrically about the blade feathering or pitch change axis 36 and which has flanged or mushroom-shaped inner end 38. End 38 preferably includes a stub-shaft 40 which may be integral with shaft 34 of separate therefrom and connected thereto by conventional connecting means, not shown. Shaft 34 is connected to housing 18 through annular, flat or disc type elastomeric bearing 42, segmented annular elastomeric shear bearing 44, and annular spherical elastomeric bearing 28. Bearings 42 and 28 are preferably of the laminated type more fully disclosed in Hinks U.S. Pat. No. 2,900,182 with flat bearing 42 being of the type shown generally in FIG. 7 thereof and spherical bearing 28 being of the type shown generally in FIG. 8 thereof. Spherical bearing 28 comprises a plurality of spherically shaped laminates or layers which are alternately elastomeric and rigid material, such as metal, and which are preferably bonded together. The outer elastomeric laminate is bonded or otherwise connected to spherical surface 26 of outer race 22 and the inner elastomeric laminate is bonded or otherwise connected to spherical surface 46 and the laminates are centered about the intersection of blade lead-lag axis 52 and blade flapping axis 50 which is perpendicular to axis 52 and which intersection also includes blade feathering axis 36. Bearing 42 consists of a stacked plurality of annular flat discs or layers comprising alternately positioned elastomeric and metal disc members or layers preferably bonded together and with one end elastomeric disc bonded to race or end plate 54 and at the opposite end to race 56. Shear bearing 44 is positioned between bearings 28 and 42 and connected thereto in series/parallel arrangement so as to cooperate therewith in carrying blade centrifugal loads and sharing blade pitch change motion in a manner to be described hereinafter. The elastomeric discs or layers of bearings 28 and 42 may be made of natural rubber, while the rigid discs are made of steel or titanium. At its opposite end, shaft 34 supports sleeve 60 which, in turn, supports blade 16 for rotation therewith about feathering axis 36. Pitch horn 62 is connected to sleeve 60 cy conventional connecting means 64 and is connected at its opposite end to rod-end bearing 66 of the pitch control rod, which is connected at its opposite end in conventional fashion to conventional swashplate 68 so that swashplate motion causes the blades 16 to vary in pitch about axis 36 either collectively or cyclically.

It will therefore be seen that blade 16 is connected to hub 12 through sleeve 60, shaft 34, disc-type bearing 42, shear bearing 44, and spherical bearing 28, which connects to hub housing 18. It will also be noted that the elements just enumerated, including bearings 44, 42 and 28 are positioned in series/parallel relationship to one another.

It should be noted that this construction uses no centering bearing for bearings 44, 42 and 28. A centering bearing, such as those shown in U.S. Pat. Nos. 3,111,172 and 3,501,250 is to be distinguished from shear bearing 44 because bearing 44 does not provide a fixed pivot for blade 16. A fixed pivot for blade 16 is provided by spherical bearing 28 during normal operation of the rotor. Bearing 44 serves merely to carry those shear loads, from shaft 34 into bearing 28, which exceed the capacity of bearing 42. A typical centering bearing would carry the aforementioned shear loads from shaft 34 directly into hub housing member 18 while at the same time providing the aforementioned fixed pivot for blade 16. Such a centering bearing is infeasible in the preferred embodiment.

A lead-lag damper 70, which is of the hydraulic or pneumatic cylinder-piston type, connects to journal portion 72 of stub-shaft portion 40 of shaft 34 through bearing member 74 and serves to dampen the lead-lag motion of blade 16 about lead-lag axis 52. Such a damper is provided for each blade.

With the rotor construction shown in FIG. 1, blade 16 is mounted so as to articulate with respect to hub 12 and has freedom of motion with respect to hub 12 about feathering axis 36 for pitch change motion, about lead-lag axis 52 for lead-lag motion, and about flapping axis 50 for flapping motion. The blade flapping motion, which has a range of about 30°, and the blade lead-lag motion, which has a range of about 20°, is accommodated by spherical bearing 28. The pitch change motion, which has a range of about 60°, cannot be accommodated by any single, practically sized elastomeric bearing and, because spherical bearing 28, shear bearing 44 and flat bearing 42 are connected in series/parallel, these three bearings share the pitch change motion of the blade and carry blade centrifugal loading to the hub 12. Bearings 28, 44 and 42 are said to be in series/parallel relationship because bearings 42 and 44 are in parallel relationship and the parallel combination of bearings 42 and 44 is in series relationship to bearing 28.

An advantage of our series/parallel elastomeric bearing arrangement is that the torsional stiffness of bearings 28, 42 and 44 can be controlled so that each bearing accommodates the proportional amount of pitch change motion desired to achieve the minimum rotor space envelope. The torsional stiffness of bearings 28, 42 and 44 can be controlled by varying the size and thickness of the elastomeric laminates and by varying the durometer and shear modulus of the elastomer itself. In the case of interest the torsional stiffness of bearings 42 and 44, acting in parallel combination, is equal to the torsional stiffness of spherical bearing 28 so as to share the required pitch change motion equally between spherical bearing 28 and bearings 42 and 44 acting in combination as aforementioned. Such a bearing stiffness ratio, while not essential to our bearing arrangement, provides the advantage of a minimal size spherical bearing 28, and thereby produces an arrangement of minimal space envelope.

As stated previously, it is an object of our invention to provide a bearing in an articulated rotor which provides three degrees of freedom of the blade with respect to the rotor over substantial ranges of motion, and which can be contained within a minimal space envelope, thereby holding rotor weight and drag to a minimum. The prior art interlocking yoke design of Gorndt U. S. Pat. No. 3,106,965 will not provide the minimal space envelope desired. It was therefore decided to pass the blade or its retainer through the bearing in an attempt to reduce the space envelope. While a single bearing construction might be utilized in a helicopter rotor having minimal blade motion as by Dorand, it could not be utilized in the helicopter rotor of interest having a lead-lag range of about 20°, a flapping range of about 30°, and a pitch change range of about 60°. One of the limitations of an elastomeric bearing is the degree of motion which any one bearing can accommodate in any degree of freedom. To accommodate motion freedom over the extensive ranges of interest would have required a tremendously large single elastomeric bearing, and this would be intolerable from a minimum space envelope and rotor drag and weight standpoint. It was realized that a spherical bearing would be needed to provide blade freedom of motion about the lead-lag and flapping axes, however, because such a spherical bearing tapers away from thru-shaft 34 as shown at angle $\phi$ so as to increase the space envelope required for the bearing, an objective of this invention is to keep the height $h$ of the spherical bearing to a minimum, and thereby maintain the bearing space envelope at a minimum. It was realized that a spherical bearing sized only to accommodate the required lead-lag and flapping motion would be of minimum height and would also be capable of accommodating a portion of the required pitch change motion. It was further realized that the remainder of the required pitch change motion could be accommodated by a flat elastomeric disc bearing placed in series, which would not increase the rotor space envelope.

In view of the fact that elastomeric bearing 28 is incapable of carrying rotor shear loads during certain modes of rotor operation, such as rotor start-up and rotor braking, it is deemed important to include shear bearing 44 in this construction. While it would have been possible to use a plain bearing between shaft 34 and bearings 28 and 42 to serve as a shear bearing, such would be inconsistent with the overall reliability of this system, since elastomeric bearings are considerably more reliable than are plain bearings. It was accordingly deemed essential that shear bearing 44 be an elastomeric bearing.

In the rotor head construction of interest, the magnitude of the rotor in-plane shear loads are sufficiently high that shear bearing 44 is deemed essential to retain the blade shaft 34 in proper alignment with bearings 42 and 28. Accordingly, to maintain the reliability of the entire bearing system at the same high level, elastomeric shear bearing 44 is utilized in this application. It was realized from the start that an elastomeric bearing which would be capable of accommodating the required pitch change motion between the inner race 47 of spherical bearing 28 and the shaft 34 would of necessity be of such size that it could not be fitted into an annular space between these two parts. To be able to fabricate elastomeric shear bearing 44 in minimum space envelope, it was decided that by controlling the torsional stiffness of spherical bearing 28 and disc-type bearing 42 so that they substantially equally shared the pitch change motion, thereby bringing the relative motion between inner race 47 of spherical bearing 28 and shaft 34 down to about 50 percent of the required pitch change motion, we could reduce the size of shear bearing 44 to such a size that we were able to place elastomeric shear bearing 44 annularly about shaft 34 and axially between inner race 47 and disc-type bearing 42.

Figures 2, 3:
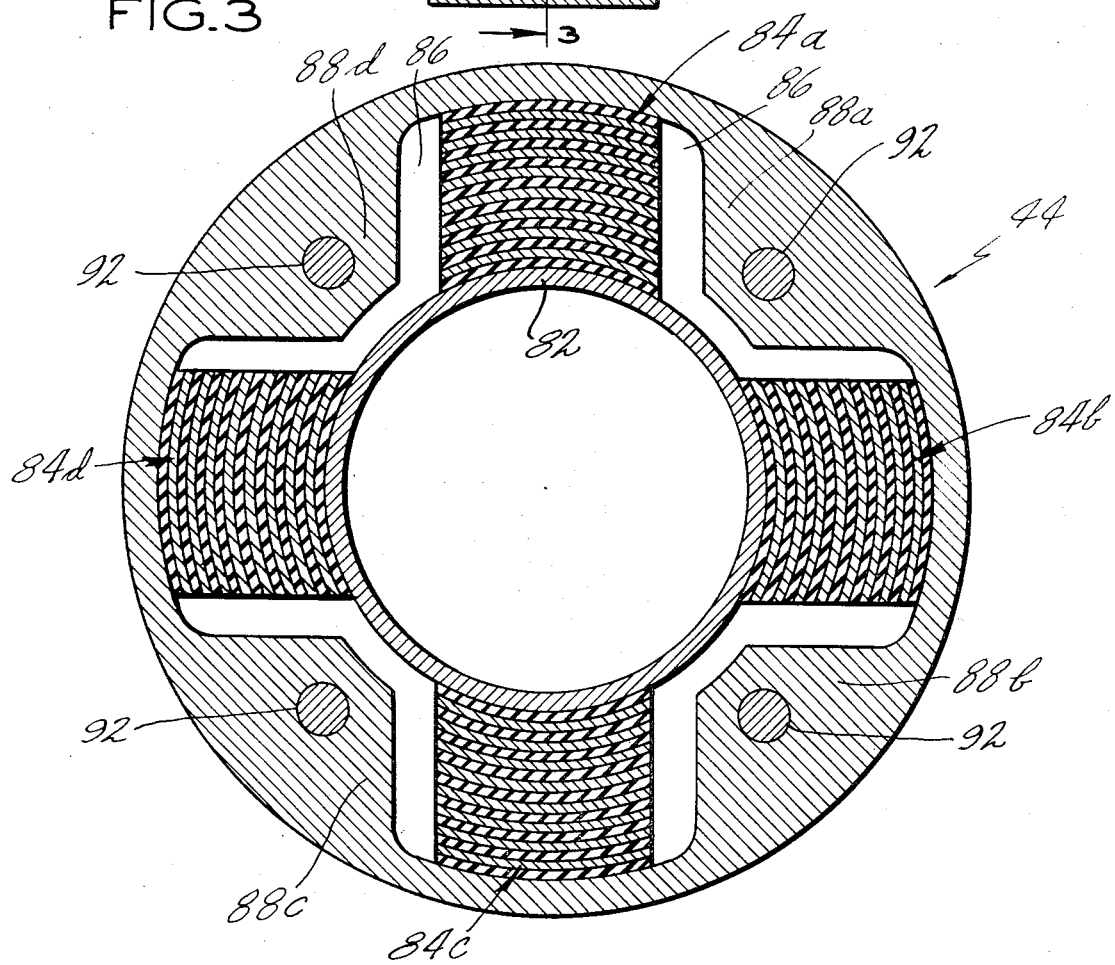
FIG. 2 is a cross-sectional side view of the shear bearing of our bearing assembly.
FIG. 3 is a view of the shear bearing of our bearing assembly taken along line 3—3 of FIG. 2.

Elastomeric shear bearing 44 is shown in greater particularity in FIGS. 2 and 3. Viewing FIG. 2, we see that shear bearing 44 is preferably annular in shape and concentric about feathering axis 36 and includes cylindrical outer race 80 and cylindrical inner race 82. A plurality of circumferentially oriented laminate stacks 84, comprised of alternate layers of elastomer laminates or layers and rigid laminates which may be made of natural rubber and steel or titanium, respectively, preferably bonded together and with the outer elastomer layer bonded or otherwise connected to the inner surface of outer race 80 and the inner elastomer layer bonded or otherwise connected to the outer surface of the inner race 82. Inner race 82 is sized so as to form a sufficient negative radial clearance with thru-shaft 34 so that no relative motion therebetween can occur during pitch change operation.

In view of the orientation of the laminates 84, as best depicted in FIG. 2, it is evident that these laminates are incapable of carrying blade centrifugal loads and therefore other mechanism is provided to carry the blade centrifugal loading between bearings 42 and 28. Accordingly, laminated bearings 84 were circumferentially segmented into four stacks 84a, 84b, 84c and 84d as shown in FIG. 3 to permit the placement of substantially triangular shape, structural segment members 88a, 88b, 88c and 88d therebetween. These segments extend the full axial length of bearing 44 and carry blade centrifugal forces in compression through bearing 44 utilizing the spaces between elastomeric segments 84a, 84b, 84c and 84d. This arrangement provides for the carrying of blade centrifugal forces through bearing 44 without straining elastomeric segments 84a–84d. Each triangular structural segment member 88a, 88b, 88c and 88d includes selectively positioned bolt or pin holes, such as 92, therethrough for connection in conventional fashion to spherical bearing inner race 47 at one end, and to the end plate or flange 56 of disc-type bearing 42 at its opposite end. It has been found convenient to connect structural member 88 directly to the bearing outer race 80, in fact, to make these connector members integral therewith as a single unit. Spaces 86 are provided adjacent to laminate stacks 84a–84d so as to provide clearance for the torsional rotation of segments 84, with respect to inner race 82 which is fixed to shaft 34. It will accordingly be seen that shear bearing 44 is therefore positioned between and connected to bearings 42 and 28 in a series/parallel relationship and cooperates therewith in sharing blade pitch change motion and in carrying blade centrifugal loads to the hub. Shear bearing 44 will also rotate about pitch change axis 36 in cooperation with bearings 42 and 28.

Preferably, elastomer stacks 84b and 84d are positioned in the plane of rotor 12 so as to carry rotor in-plane shear loads, caused by rotor rotational loads particularly during start-up and rotor braking, and laminate stacks 84a and 84c are positioned substantially perpendicular thereto to carry rotor out-of-plane shear loads caused by blade flapping and other phenomenon. These shear loads follow a load path from rotor hub 12 through spherical bearing 28 in shear fashion, then into spherical bearing inner race 47. At this point, the shear load passes through shear bearing 44 and into shaft 34.

While we illustrate elastomer stacks 84a–84d to be of substantially equal circumferential dimension, it should be borne in mind that they are preferably of the required circumferential dimension to properly carry in compression the rotor shear loads passing therethrough, and accordingly need not be of equal circumferential dimension.

Another advantage in using segmented elastomer stacks 84a–84d is that it permits the precompressing of the laminates between bearing inner race 82 and bearing outer race 80 during the bearing assembly procedure, thereby preventing the buildup of tensile stresses on the backside of the elastomer laminates which would otherwise occur under a reversing load. This precompression and the attendant prevention of tensile stresses in the laminated bearing greatly improves the performance of the elastomeric bearing since tensile stress and strain are detrimental to the physical integrity of this type of bearing. This segmentation, preferably through a relatively small circumferential arc, and stacking, permits the aforementioned compression preloading to be distributed radially equally throughout the stack of laminates 84a–84d and thereby better prevents the aforementioned tension loading problem. If larger segments were used, such as semi-circular segments, the innermost laminates would not receive their proportionate share of the preload in compression and would accordingly be more susceptible to tensile stress and strain problems.

It will accordingly be seen that shear bearing 44 is elastomeric in nature with the reliability advantages thereof, carries shear loads in compression, has been fabricated so as to cooperate with elastomeric bearings 42 and 28 to carry blade centrifugal loads and share pitch change motion, is capable of being precompressed to avoid tensile strain or stress under reverse loading, is capable of occupying a minimal space envelope, and can be selectively segmented so as to carry the amount of shear load to be imposed thereon.

We wish it to be understood that we do not desire to be limited to the exact details of construction shown and described for obvious modifications will occur to a person skilled in the art.

We claim:

1. An articulated helicopter rotor including:
   A. a rotor hub mounted for rotation about an axis of rotation,
   B. at least one helicopter blade extending substantially radially from said hub and including pitch change, lead-lag and flapping axes intersecting at a common point,
   C. a bearing assembly supporting said blade from said hub for articulated motion about the point of intersection of said axes and including:
      1. a spherical elastomeric bearing centered about said point of intersection and connected to said hub,
      2. a shear elastomeric bearing connected to said spherical elastomeric bearing and to said blade and including:
         a. a plurality of circumferentially extending laminates concentrically enveloping the blade pitch change axis so that the laminates carry rotor shear loads in compression.

2. A rotor according to claim 1 wherein said plurality of circumferentially extending laminates constitute a plurality of circumferentially segmented laminate stacks extending in substantially radial directions with respect to the blade pitch change axis.

3. A rotor according to claim 2 wherein the laminates of each stack are precompressed and of minimum circumferential arc to permit even radial precompression across each stack.

4. A rotor according to claim 3 wherein two diametrically opposed laminate stacks are positioned to carry rotor in-plane shear loads and two diametrically opposed laminate stacks are positioned to carry rotor out-of-plane shear loads.

5. A rotor according to claim 4 wherein the first set of diametrically opposed laminate stacks is of different circumferential dimension than the second set of diametrically opposite laminate stacks in proportion to the shear load carried therethrough.

6. A rotor according to claim 1 wherein said circumferentially segmented laminates of said shear elastomeric bearing are circumferentially segmented into a plurality of circumferentially segmented laminated stacks and including structural members capable of withstanding blade centrifugal loading positioned between at least two of said stacks and extending between said spherical bearing and said blade and attached thereto to carry the blade centrifugal loading across said shear elastomeric bearing from the blade to the spherical bearing.

7. A rotor according to claim 6 and wherein said shear elastomeric bearing includes an outer race and an inner race on opposite radial sides of said laminates and wherein said structural members are connected to said outer race.

8. A rotor according to claim 7 wherein said structural members and said shear bearing outer race are integral.

9. A rotor according to claim 1 wherein said shear elastomeric bearing includes an outer race and an inner race with said laminates sandwiched therebetween, and wherein said laminates include alternate layers of elastomeric material and rigid material and with the outer elastomeric laminate abutting the inner surface of the outer race and with the inner elastomeric laminate abutting the outer surface of the inner race.

10. A rotor according to claim 1 and including a blade end-shaft adapted to be connected to the rotor hub, wherein said spherical elastomeric bearing and said shear elastomeric bearing are annular in shape and envelope said end-shaft and including a disc-type elastomeric bearing of annular shape enveloping said end-shaft and positioned therearound between said shear elastomeric bearing and said end-shaft and connected to each so that said spherical, shear and disc-type elastomeric bearings are positioned in series/parallel relationship between said blade and said hub and constitute the sole support for said blade for said hub.

11. A rotor according to claim 10 wherein said plurality of circumferentially extending laminates of said shear elastomeric bearing constitute a plurality of circumferentially extending laminate stacks extending in substantially radial directions with respect to the blade pitch change axis.

12. A rotor according to claim 11 wherein the laminates of each stack are precompressed and of minimum circumferential arc to permit even radial precompression radially across each stack.

13. A rotor according to claim 12 wherein two diametrically opposed laminate stacks are positioned to carry rotor in-plane shear loads and two diametrically opposed laminate stacks are positioned to carry rotor out-of-plane shear loads.

14. A rotor according to claim 13 wherein the first set of diametrically opposed laminate stacks is of different circumferential dimension than the second set of diametrically opposite laminate stacks in proportion to the shear load carried therethrough.

15. A rotor according to claim 10 wherein said spherical bearing and said disc-type bearing are of selected torsional stiffness so as to substantially equally share blade pitch change motion therebetween, while cooperating with said shear bearing to carry blade centrifugal loading to said hub.

16. A rotor according to claim 15 wherein said stack bearing and said shear bearing are connected in parallel relationship and wherein said stack bearing and said shear bearing so connected, are connected to said spherical bearing in series relationship.

17. A rotor according to claim 16 wherein the torsional stiffness of said stack bearing and said shear bearing so connected in parallel is substantially equal to the torsional stiffness of said spherical bearing.

18. An articulated helicopter rotor adapted to mount one or more helicopter blades to extend substantially radially therefrom for motion about a blade feathering axis and intersecting blade lead-lag and blade flapping axes including:
   A. a rotor hub adapted to be mounted for rotation about an axis of rotation,
   B. blade attachment means including:
      1. an annular, spherical, laminated, elastomeric bearing having:
         a. an outer spherical race connected to said hub and shaped to define a central opening enveloping the blade feathering axis,
         b. an inner spherical race shaped to define a central opening positioned concentrically about the blade feathering axis, and with the spherical surfaces of the inner and outer race centered about the intersection of the blade flapping and lead-lag axes,
      2. an annular, disc-type laminated, elastomeric bearing having a central opening enveloping the blade feathering axis and with the disc-shaped laminates thereof lying in planes perpendicular thereto,
      3. an annular, laminated, elastomeric shear bearing having a central opening and enveloping the blade feathering axis and including:
         a. an outer race,
         b. an inner race,
         c. a plurality of circumferentially segmented laminate stacks extending in a circumferential direction about the blade feathering axis and with each stack extending in a substantially radial direction between said inner race and said outer race,
         d. structural members positioned between adjacent laminate stacks and extending between said spherical bearing and said disc-type bearing and connected to each so that said spherical, shear and disc-type elastomeric bearings are joined in series/parallel relationship.

19. A rotor according to claim 18 wherein said disc-type bearing is positioned closer to the hub axis of rotation than said spherical and shear bearings.

20. A rotor according to claim 19 and including a lead-lag damper connected to the radially inner end of said shaft member to dampen lead-lag motion thereof about the lead-lag axis.

21. A rotor according to claim 18 wherein said spherical shear and disc-type elastomeric bearings are concentric about the blade feathering axis, wherein the laminates of the spherical elastomeric bearing are alternate layers of elastomer and rigid spherical members bonded to one another and to the bearing inner and outer race, wherein the laminates of said disc-type bearing are alternate elastomer layers and rigid layers bonded to one another and connected to the connecting means and the shaft member at the opposite ends of the layer stack, and wherein the laminates of the shear bearing are alternate layers of elastomer and rigid circumferentially members bonded to one another and to the shear bearing inner and outer races.

22. A rotor according to claim 21 wherein the laminates of the spherical bearing have inner surfaces which are shaped to cooperate to form a cone with respect to the shaft member.

23. A rotor according to claim 18 wherein said blade attachment means supports said shaft member and hence said blade to permit blade pitch change motion through an angle of about 60°, to permit blade lead-lag motion through an angle of about 20°, and to permit blade flapping motion through an angle of about 30°.

24. A rotor according to claim 18 wherein said spherical and disc-type elastomeric bearings are of selected torsional stiffness and therefore substantially equally share the blade pitch change motion, and so that said spherical bearing will accommodate blade lead-lag and flapping motion.

25. A rotor according to claim 18 wherein said shear bearing laminate stacks are precompressed between said inner and outer race, and are positioned to carry rotor in-plane shear loads and rotor out-of-plane shear loads in compression.

26. In an articulated helicopter rotor wherein the helicopter blades are supported substantially radially from a rotatable hub for rotation therewith about an axis of rotation and for motion with respect thereto about a lead-lag axis, a flapping axis and a feathering axis, the improvement of a joint connecting the blade to the hub comprising:
   A. an annularly shaped, laminated, elastomeric spherical bearing having inner and outer races and stacked laminates of spherical shape centered about the intersection of the lead-lag and flapping axes and positioned substantially concentrically about the feathering axis,
   B. an annularly shaped, disc-type elastomeric bearing comprising a stack of annular, flat disc laminates positioned substantially concentrically about the feathering axis,
   C. an annularly shaped elastomeric shear bearing concentrically enveloping the feathering axis and connected to the inner race of said spherical bearing and further connected to one end of the stacked discs of said disc-type bearing so as to connect said bearings in series/parallel relationship, D. a thru-shaft passing through said spherical bearing, shear bearing and disc-type bearing and adapted to be connected at one end to the helicopter blade and connected at its opposite end to the opposite end of the disc-type bearing, and E. means connecting said spherical bearing outer race to said hub so that said blade is supported from said hub through said joint so as to be capable of lead-lag and flapping motion which is accommodated through the torsional motion of said spherical bearing, and so as to also be capable of pitch change motion which is accommodated through the cooperation of said disc-type bearing and said spherical bearing and so that both of said bearings cooperate to impart the blade centrifugal loads to the hub.

27. A rotor according to claim 26 wherein said elastomeric shear bearing includes:

A. an outer race,
B. an inner race,
C. a plurality of laminate stacks extending between said inner and outer races and with said stacks selectively positioned to carry rotor shear loads therethrough in compression, and with said stacks being of selected circumferential dimension to permit equalized precompression across the laminates of the stack, and wherein said laminate stacks comprise alternate elastomer layers and rigid laminates bonded together and with the outer elastomeric layers bonded to the inner surface of the outer race and the inner elastomer layer bonded to the outer surface of the inner race, D. a structural member of selected shape extending between adjacent laminate stacks and extending axially between said spherical bearing and said disc-type bearing and connected thereto so as to carry blade centrifugal loading across said elastomeric shear bearing.

28. In an articulated helicopter rotor wherein the helicopter blades are supported substantially radially from a rotatable hub for rotation therewith about an axis of rotation and for motion with respect thereto about a lead-lag axis, a flapping axis and a feathering axis, the improvement of a joint connecting the blade to the hub comprising:

A. a spherical elastomeric bearing having inner and outer races and elastomer filler therebetween of spherical shape centered about the intersection of the lead-lag and flapping axes,
B. a disc-type elastomeric bearing,
C. an elastomeric shear bearing connected to the inner race of said spherical bearing and further connected to one end of said disc-type bearing so as to connect said bearings in series/parallel relationship, D. a thru-shaft passing through said spherical, shear, and disc-type bearings and adapted to be connected at one end to the helicopter blade and connected at its opposite end to the opposite end of the disc-type bearing, and E. means connecting said spherical bearing outer race to said hub so that said blade is supported from said hub through said joint so as to be capable of lead-lag and flapping motion which is accommodated through the torsional motion of said spherical bearing, and so as to also be capable of pitch change motion which is accommodated through the cooperation of said disc-type bearing and said spherical bearing and so that said spherical, shear and disc-type bearings cooperate to impart the blade centrifugal loads to the hub.

29. A rotor according to claim 28 wherein the improved joint supports said connecting member and hence the blade for pitch change motion through about a 60° angle, for lead-lag motion through about a 20° angle, and for flapping motion through about a 30° angle.

30. A rotor according to claim 28 wherein said spherical elastomeric bearing is of selected torsional stiffness with said disc-type elastomeric bearing so that said spherical bearing and said disc-type elastomeric bearing will accommodate substantially equal shares of the blade pitch change motion so as to minimize the amount of relative pitch change motion between said thru-shaft and said bearings, and so that said spherical bearing will accommodate blade lead-lag and flapping motion.

31. A rotor according to claim 30 wherein said elastomeric shear bearing includes:

A. an outer race,
B. an inner race,
C. a plurality of laminate stacks extending between said inner and outer races and with said stacks selectively positioned to carry rotor shear loads therethrough in compression, and with said stacks being of selected circumferential dimension to permit equalized precompression across the laminates of the stack, and wherein said laminate stacks comprise alternate elastomer layers and rigid laminates and with the outer elastomer layer bearing against the inner surface of the outer race and the inner elastomer layer bearing against the outer surface of the inner race, and
D. a structural member of selected shape extending between adjacent laminate stacks and extending axially between said spherical bearing and said disc-type bearing and connected thereto so as to carry blade centrifugal loading across said elastomeric shear bearing.

* * * * *